US005984054A

United States Patent [19]

Martinsson

[11] Patent Number: 5,984,054

[45] Date of Patent: Nov. 16, 1999

[54] BRAKE ARRANGEMENT IN A MOTOR SAW

[75] Inventor: Pär Martinsson, Jönköping, Sweden

[73] Assignee: Aktiebolaget Electrolux, Stockholm, Sweden

[21] Appl. No.: 08/929,695

[22] Filed: Sep. 15, 1997

[30] Foreign Application Priority Data

Oct. 25, 1996 [SE] Sweden ................................ 96039911

[51] Int. Cl.[6] ...................................................... F16D 51/00

[52] U.S. Cl. ........................................................... 188/77 R

[58] Field of Search ............................... 188/77 W, 77 R, 188/166; 192/17 R, 69.7, 80, 81 C; 74/2

[56] References Cited

U.S. PATENT DOCUMENTS

| | | | |
|---|---|---|---|
| 3,923,126 | 12/1975 | Bidanset | 188/77 W |
| 4,026,392 | 5/1977 | Hirschkoff | 192/17 R |
| 4,586,588 | 5/1986 | Nagashima et al. | 188/77 R |
| 5,503,255 | 4/1996 | Martinsson et al. | 188/77 W |

FOREIGN PATENT DOCUMENTS

| | | |
|---|---|---|
| 2632304 | 2/1977 | Sweden . |
| 458020 | 2/1989 | Sweden . |
| 459564 | 7/1989 | Sweden . |

*Primary Examiner*—Robert J. Oberleitner
*Assistant Examiner*—Mariano Sy
*Attorney, Agent, or Firm*—Pearne, Gordon, McCoy & Granger LLP

[57] ABSTRACT

In a motor chain saw comprising a motor housing (10), a removable clutch cover (16) and an emergency chain brake (18–20) attached to the clutch cover, a hand guard (11) is provided which is pivotably attached to the motor housing by at least one lever (12). The lever (12) is provided with a first clutch part (14) which is adapted to be releasably engaged with a second, complementary clutch part (15) connected to the chain brake.

9 Claims, 2 Drawing Sheets

BRAKE ARRANGEMENT IN A MOTOR SAW

BACKGROUND OF THE INVENTION

The present invention relates to a brake arrangement for a handheld power tool, especially a motor chain saw, comprising a motor housing, a detachable clutch cover, a brake attached to said clutch cover, and a hand guard for activating said brake, said hand guard being pivotably attached to said motor housing by at least one lever.

It is previously known in chain saws to use a hand guard comprising two levers pivotably attached to the motor housing at opposite sides thereof. The hand guard actuates an emergency chain brake which is also attached to the motor housing.

It is also known to use a hand guard having a single lever which is pivotably attached to the clutch cover and actuates a chain brake which is also attached to the clutch cover.

It is advantageous to have the chain brake attached to the clutch cover in that the service and maintenance of the brake is facilitated. It is therefore preferable to have the brake mounted in this manner even when the hand guard is journalled to the motor housing, either by means of a single lever or by two levers journalled to opposite sides of the motor housing.

SUMMARY OF THE INVENTION

The object of the present invention is to provide a brake arrangement comprising a hand guard pivotably attached to one side, or both sides, of the motor housing and cooperating with a chain brake attached to the clutch cover. This has been achieved by means of a brake arrangement of the kind mentioned in the introduction which according to the invention is characterized in that the lever has a first clutch part adapted to cooperate with a second clutch part connected to said brake.

BRIEF DESCRIPTION OF THE DRAWINGS

A preferred embodiment of the invention will be described in more detail in the following with reference to the accompanying drawings, in which.

DETAILED DESCRIPTION OF THE PREFERRED EMBODIMENT

Figure 1:
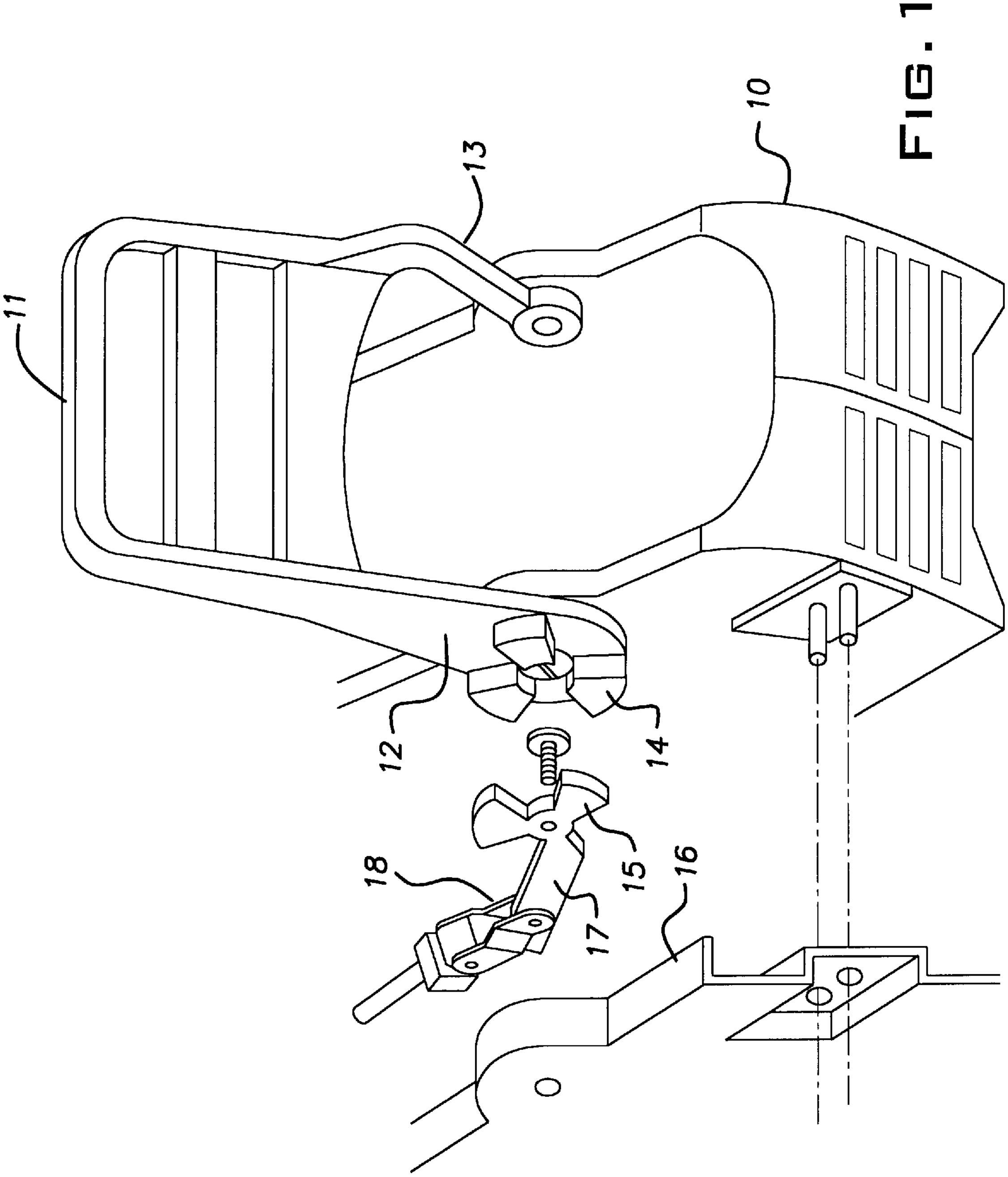
FIG. 1 is an exploded, partial perspective view in schematic form of a motor chain saw provided with the brake arrangement according to the invention.
Figure 2:
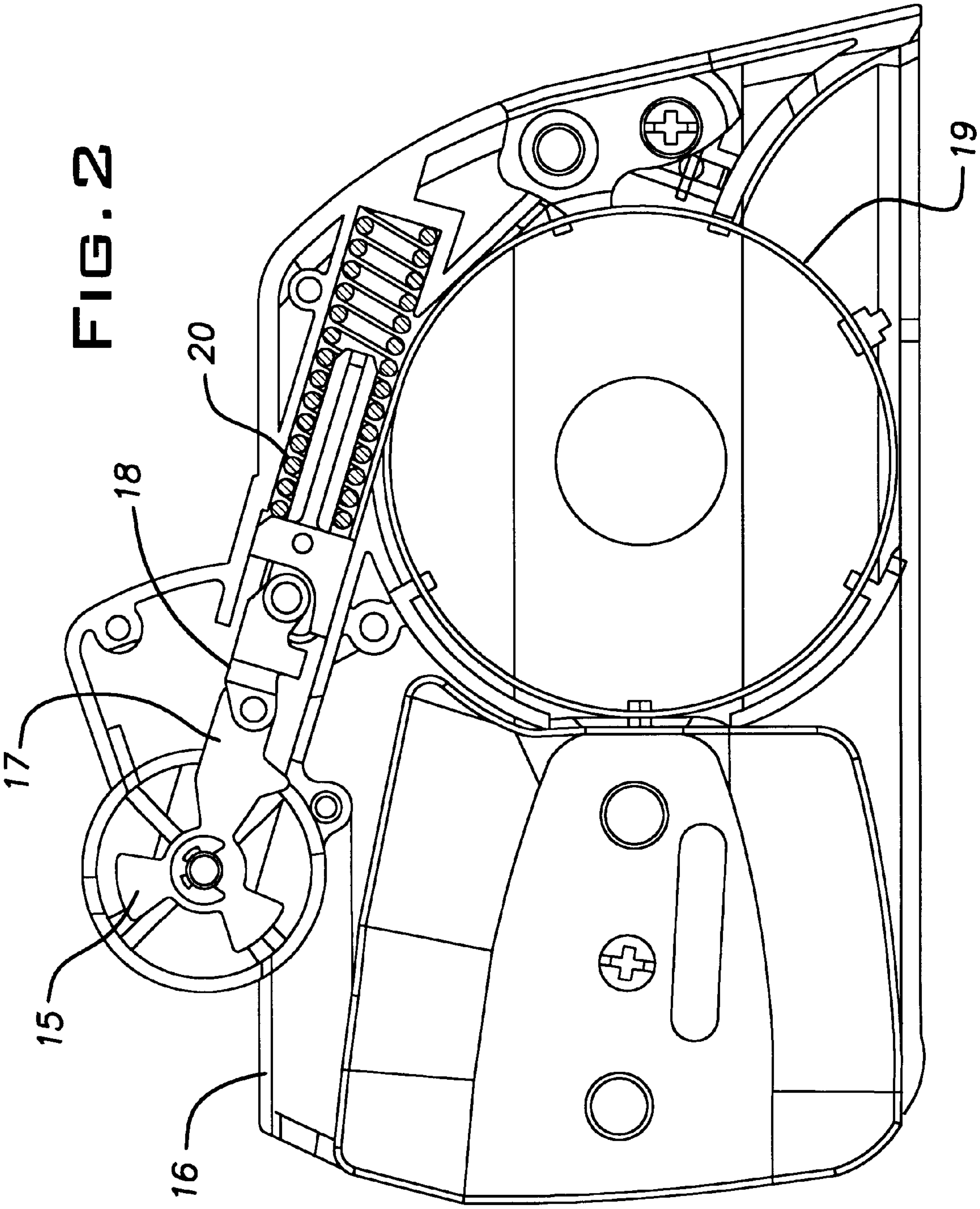
FIG. 2 is a side view on a larger scale of a clutch cover forming part of the motor chain saw.

The motor chain saw illustrated in FIG. 1 comprises a motor housing 10 having a hand guard 11 which is pivotably attached to opposite sides of the top portion of the motor housing by means of two levers 12, 13. One of the levers 12 is provided at its axis of rotation with a first clutch member 14 comprising three protrusions having a shape similar to a circle sector and preferably being made integral with the lever 12. The clutch member 14 cooperates with a second, complementary clutch member 15 constituting a part of a chain brake attached to a clutch cover 16. The second clutch member 15 is made integral with a lever 17 constituting a link of a toggle-joint mechanism 18 for activating the chain brake. As is shown in FIG. 2, the chain brake comprises a brake band 19 encircling a clutch drum (not shown) and being actuated by a spring 20. Besides, the chain brake is of a conventional type and will therefore not be described in detail.

Since the clutch parts 14, 15 are integrated with the respective levers, no additional separate clutch parts are required. This means that the cost may be kept very low, since the manufacture or assembly of separate clutch parts will not be necessary.

When the clutch cover is attached to the motor housing 10, the clutch parts 14, 15 will engage each other to form a releasable dog clutch. When the hand guard is actuated by the operator, the movement of the lever 12 will be transmitted via said dog clutch to the toggle joint mechanism 18 whereby the chain brake is activated to brake the saw chain, or reset after being activated, depending on the direction of movement of the hand guard.

Owing to the described dog coupling 14, 15 the clutch cover 16 with the chain brake attached thereto can be easily dismantled from the motor housing 10 without dismantling the hand guard 11. This is advantageous in that a hand guard pivotably attached to both sides of the motor housing can be used at the same time as the clutch cover can be easily dismantled for maintenance or repair of the chain brake.

I claim:

1. Brake arrangement for a handheld power tool, said brake arrangement comprising a motor housing (10), a detachable clutch cover (16), a brake (18–20) attached to said clutch cover and including a brake band, said clutch cover adapted to cooperate with said motor housing to enclose at least a substantial portion of said brake band when said clutch cover is attached to said motor housing, and a hand guard (11) for activating said brake, said hand guard being pivotably attached to said motor housing by at least one lever (12), wherein said at least one lever has a first clutch part (14) adapted to cooperate with a second clutch part (15) connected to said brake.

2. Brake arrangement according to claim 1, wherein the clutch parts (14, 15) constitute a releasable dog clutch.

3. Brake arrangement according to any of claims 1 or 2, wherein the second clutch part (15) is operatively connected to a toggle-link mechanism (18) adapted to latch the brake in an inoperative position and to be actuated for activating the brake.

4. Brake arrangement according to any of claims 1–2, wherein the hand guard (11) is provided with two levers (12, 13) pivotably attached to the motor housing (10) at opposite sides thereof.

5. Brake arrangement according to any of claims 1–2, wherein the brake (18–20) is an emergency chain brake for a motor chain saw.

6. Brake arrangement according to claim 3, wherein the hand guard (11) is provided with two levers (12, 13) pivotably attached to the motor housing (10) at opposite sides thereof.

7. Brake arrangement according to claim 3, wherein the brake (18–20) is an emergency chain brake for a motor chain saw.

8. Brake arrangement according to claim 4, wherein the brake (18–20) is an emergency chain brake for a motor chain saw.

9. Brake arrangement according to claim 6, wherein the brake (18–20) is an emergency chain brake for a motor chain saw.

* * * * *

UNITED STATES PATENT AND TRADEMARK OFFICE

CERTIFICATE OF CORRECTION

PATENT NO. : 5,984,054

DATED : November 16, 1999

INVENTOR(S) : Martinsson

It is certified that error appears in the above-indentified patent and that said Letters Patent is hereby corrected as shown below:

On the Title Page, Section [30], delete "96039911" and insert --9603911-0--.

Signed and Sealed this

Eleventh Day of July, 2000

Attest:

Q. TODD DICKINSON

*Attesting Officer*

*Director of Patents and Trademarks*